United States Patent [19]

Moreau

[11] Patent Number: 5,638,768
[45] Date of Patent: Jun. 17, 1997

[54] FRONT POSITIONING RAIL FOR MILKING PARLOR

[75] Inventor: Joseph R. Moreau, New Hartford, N.Y.

[73] Assignee: Norbco, Inc., Westmoreland, N.Y.

[21] Appl. No.: 588,635

[22] Filed: Jan. 19, 1996

[51] Int. Cl.$^6$ .................................................. A01K 1/12
[52] U.S. Cl. .................... 119/14.03; 119/520; 119/739
[58] Field of Search ................................ 119/14.03, 749,
  119/750, 751, 752, 756, 757, 763, 729,
  739, 520

[56] References Cited

U.S. PATENT DOCUMENTS

| | | | |
|---|---|---|---|
| 3,734,059 | 5/1973 | Rodrigues | 119/520 |
| 4,432,305 | 2/1984 | Vernese | 119/752 |
| 4,951,608 | 8/1990 | Reisgies et al. | 119/14.03 |
| 5,184,567 | 2/1993 | Peacock | 119/14.03 |
| 5,203,280 | 4/1993 | Nelson | 119/14.03 |
| 5,230,299 | 7/1993 | Moreau | 19/14.03 |
| 5,285,746 | 2/1994 | Moreau | 119/752 X |
| 5,441,016 | 8/1995 | Ricketts | 119/752 X |

FOREIGN PATENT DOCUMENTS

| | | | |
|---|---|---|---|
| 7802256 | 9/1979 | Netherlands | 119/14.03 |
| 1186172 | 10/1985 | U.S.S.R. | |

OTHER PUBLICATIONS

Germania, product brochure, "And Now—The Common Sense Alternative to Parallel Stalls; PRO–TIME ParaBones From Germania," Germania Dairy Automation, Inc., 1993.

Primary Examiner—Robert P. Swiatek
Assistant Examiner—Yvonne R. Abbott
Attorney, Agent, or Firm—Trapani & Molldrem

[57] ABSTRACT

A front positioning rail for a diagonal milking parlor, in which cows stand alongside one another at an angle to the curb, is movable between a milking position and a release position. In the milking position the rail restrains the cows with their heads projecting over the rail with the briskets of said cows contacting the rail. In this rail assembly an elongated rail member extends laterally, and has a proximal generally vertical side and a horizontal upper edge. A plurality of vertical positioning loops rise above the upper edge and define head positions for the cows. The loops preferably have one vertical side and one sloping side, so that cows are discouraged from turning around in the parlor, but can slide down if they enter a position ahead of an unoccupied position. The positioning loops are spaced from one another at a predetermined interval. An air cylinder or other mechanism moves the rail member between the milking position and the release position so that said cows can exit said parlor. In one embodiment, the rail member proximal side has an upper tapered portion that slopes distally upwards so as to conform generally with the shape of the cow's brisket. The rail member can be indexed to bring the hind end of the cows against a back rail or splash shield.

11 Claims, 3 Drawing Sheets

1

FRONT POSITIONING RAIL FOR MILKING PARLOR

BACKGROUND OF THE INVENTION

This invention relates in general to cattle stalls, e.g., milking parlors, and is more particularly directed to a front positioning rail for a diagonal milking parlor. The invention is more particularly concerned with an improved rail that assists the cows in self-positioning, and accommodates cows of various lengths. The invention is further concerned with a brisket rail which permits indexing, or bringing the rear legs of the cattle against the back wall or splash shield of the parlor, and which further moves or lifts away to permit the cows to exit the parlor after milking.

A milking parlor generally consists of an array of individual stalls, each being designed to hold a single cow as she is being milked. The cows are walked into the parlor through an entry gate, and then each cow is directed to her respective stall. There an attendant washes her udders, attaches a milking unit, monitors and attends to the milking operation, disconnects the milking unit, and releases the cows so another group of cows can be milked. In parlors of this type, the cows proceed in single file through the entry gate into the parlor, and can exit, either in the same fashion through an exit gate at the far end, or in gang fashion out the side of the parlor. There are various schemes for milking parlors, including herringbone, diagonal, and parallel or side-by-side. A parallel milking parlor operation is described in my earlier U.S. Pat. Nos. 5,230,299 and 5,285,746.

A relatively new design in milking parlors is a hybrid of the parallel and herringbone configurations. These parlors place the cows at an angle of 50 to 70 degrees relative to the curb line. In a conventional herringbone parlor, the cow is at 30 degrees to no more than 45 degrees to the curb line, with a spacing of between 36 inches and 44 inches between cows along the curb line. By contrast, the parallel or side-by-side parlor places the cows at 90 degrees, and at a spacing of 27 inches to 29 inches along the curb line, but requires the cows to be milked between their hind legs. In the hybrid diagonal design, the cows are placed at a typical angle of 50 to 60 degrees, with a spacing between cows of 30 inches. It is possible to achieve a steeper angle of 70 degrees and a spacing of only 27 inches along the curb. An example of an existing diagonal parlor design is the ParaBone® parlor, sold by Germania Dairy Automation, Inc. An example of brisket bar apparatus for aligning cows in both a herringbone and a diagonal parlor, and for releasing them after milking, is described in Reisgies et al. U.S. Pat. No. 4,951,608.

Sequencing gates, which are required in parallel or side-by-side parlors, are omitted in the diagonal parlor. This simplifies installation, and also aids in cow entry, as it creates a wider lane for the cows. However, as the angle of the parlor increases towards 90 degrees, the problem of cows turning around increases. At 90 degrees or other high angle, the cows can move left or right where there are no sequencing gates. In the standard parallel parlor, the sequencing gates serve the purposes of restricting cows to right angle positioning, and act as a barrier to cows moving away from their positions. On the other extreme, in the herringbone design, i.e., at angles of 30 degrees, the cows do not have space to turn around. However, as the angle increases, e.g., at 55 degrees to 70 degrees, cows have enough space to turn around if they are disturbed or "spooked."

Another shortcoming of the diagonal parlor—when a conventional front rail is used—is that of defining the proper milking or stall positioning for the cows. Where there is no definite position for the cow to take along the front positioning rail, overloading or underloading of the parlor frequently occurs. Cows can "bunch up" or fit loose along the rail. This is of course a problem because there are a given number of milking units, e.g., eight units, for a given parlor. Underloading means that the parlor is not used to capacity, and overloading means that at least one cow must be milked with a portable milking unit, which also decreases parlor efficiency. At the rear of the parlor, the splash or manure shield can be of a serpentine or S-shaped configuration, but this is on the side away from the cow's head. The cows cannot easily, and often do not follow the S configuration as to where they place their hind ends. Of course, where the parlor has a straight splash shield, there is nothing to define where the cow's hind end should be placed. Since the number of milking units and the automated equipment is fixed, and because these units are disposed at the rear of the stalls for a given number of cows and at a relatively fixed position, cows placed erratically in the parlor—or extra cows—present a hindrance to efficient milking.

A further shortcoming of the standard or conventional front rail is the manner that it indexes the cows, i.e., brings them to the proper milking position with their hind legs against the back rail or splash shield. Where the front rail is movable, the rail is in a forward position when the cows enter the parlor. After the cows have moved into the parlor, the front rail assembly can move back towards the cows, e.g., by air cylinder operation. This shortens the distance from the front rail to the rear splash shield. Cows can compensate for this in two ways, i.e., either by backing up against the splash shield (the desirable action) or by sliding forward along the front rail and changing angle (which is undesirable). When the cows only move along the from rail, the cows will be in a poorer milking position, that is, a worse position for access by the operator. In longer cows, some change of angle is acceptable as long as they have first moved their hind legs against the splash shield. This action actually provides the longer cow with more space and does not "trap" her in. Also, when the longer cows turn slightly, the front rail can continue to come back and index the shorter cows as well as the longer cows against the splash shield. In an ideal front positioning rail assembly, some limited sliding along the rail is desirable for the longer cows, but should be discouraged until the cows are all the way back against the splash shield.

OBJECTS AND SUMMARY OF THE INVENTION

Accordingly, it is an object of this invention to provide a front positioning rail for a diagonal milking parlor, and which overcomes the drawbacks of the prior art.

It is another object to provide a front positioning rail to be used in a diagonal milking parlor in which the cattle are oriented at an angle of up to about 70 degrees, which defines the from position for the cows, and which discourages cows from turning around, even in the absence of sequencing gates.

It is a further object to provide a front positioning rail for a milking parlor which discourages the cows from changing angle, i.e., sliding down, as the rail moves back to index the cow, but which does permit some angling of the longer cows so that all cows will be lined up evenly (indexed) in the most rearward position against the splash shield.

It is a still further object to provide a milking parlor in which the cows can be spaced closely (i.e., at spacing on the order of about 27 inches) but without sequencing gates.

In accordance with an aspect of the present invention, a front positioning rail is constructed for a milking parlor in which cows stand alongside one another. The front positioning rail is movable between a milking position and a release position. In the milking position, the rail restrains the cows with their heads projecting over the rail and with the rail contacting briskets of the cows above their front legs and below their heads. In order to achieve the objectives of this invention, the front positioning rail comprises an elongated rail member that extends laterally, across the front of the parlor. The rail member has a proximal generally vertical side and a horizontal upper edge. A plurality of vertical positioning loops rise above the upper edge of the rail member and define head positions for the cows. The positioning loops have left and right edges, and are spaced from one another at a predetermined interval. Means of suitable type move the rail member between the milking position and release position in which the cows can exit the parlor.

In a preferred construction the rail member proximal side has an upper tapered portion that slopes distally upwards so as to conform generally with the shape of a cow's brisket. Another design could be a round or half-round tube of approximately three inches to six inches in diameter. The positioning loops can have a generally triangular shape, so that one of its sides rises substantially vertically and the other side slopes diagonally upward. The loops preferably have a sheet metal gusset affixed inside the loops to prevent cows from placing their hooves through the loop.

Preferably, the rail assembly swings up to release the cows after milking. In that case the means for moving the rail member can include an overhead pivot above the rail and swing-up support member or members supporting the rail member. The rail is coupled by means of a journal member, e.g., a sleeve, on the overhead pivot. The journal member can include means permitting proximal-distal play of several inches when the rail is in the milking position, so as to achieve gravity indexing. The rail support members can comprise a plurality of U-shaped members connecting the journal member or members and the front rail member.

The above and many other objects, features, and advantages of this invention will become apparent from the ensuing detailed description of a preferred embodiment, which should be read in connection with the accompanying Drawing.

BRIEF DESCRIPTION OF THE DRAWING

FIG. 1A is a cross-sectional view taken at 1A—1A of FIG. 2.

DETAILED DESCRIPTION OF THE PREFERRED EMBODIMENT

Figure 1:
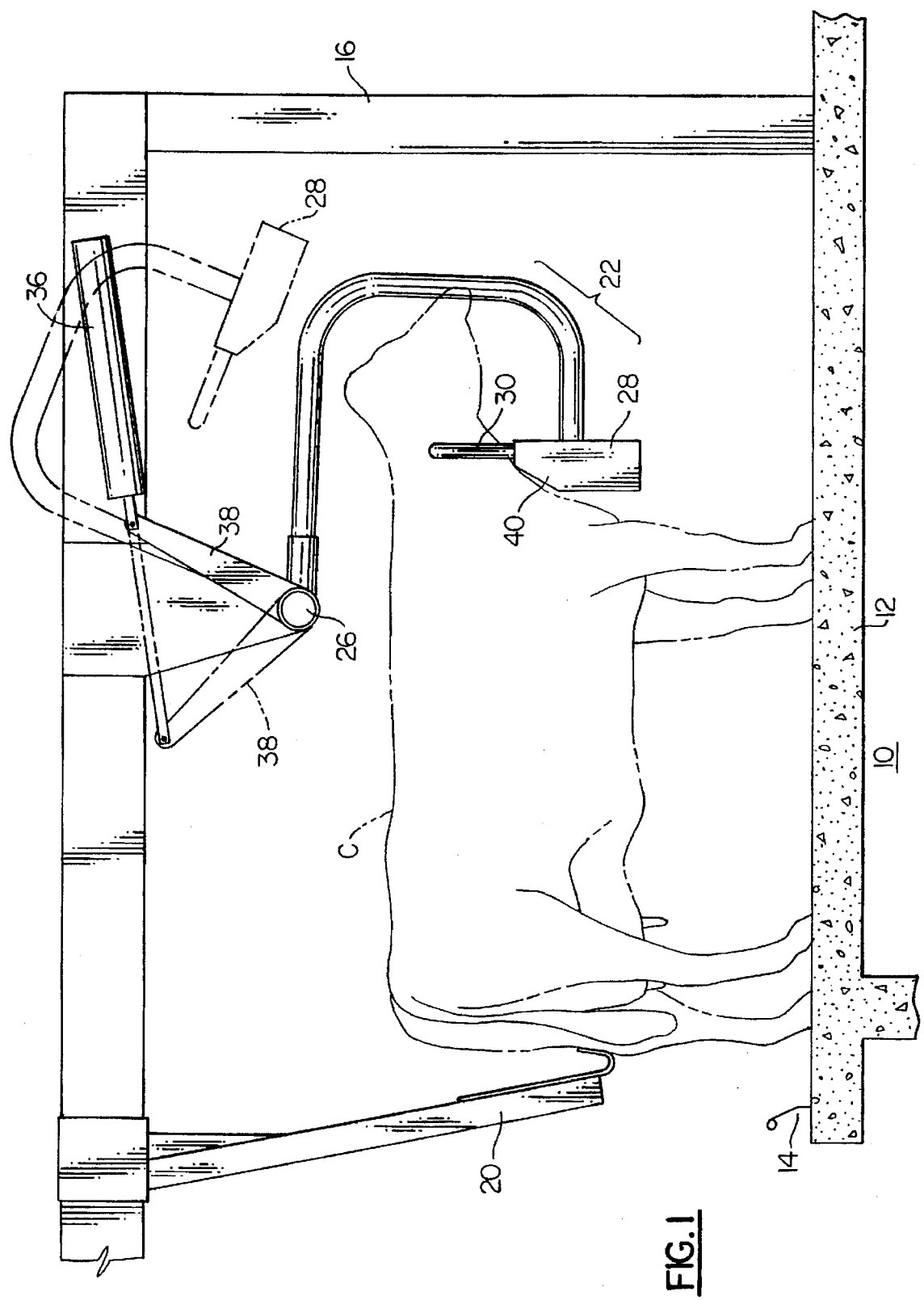
FIG. 1 is an end view showing a diagonal milking parlor which includes a front positioning rail according to an embodiment of this invention.

With reference now to the Drawing, and initially to FIG. 1, a milking parlor 10 (only a portion of which is illustrated) includes a cow stand or platform 12 that is formed of poured concrete, with a curb 14 at one edge, here shown at the left. The curb 14 is disposed adjacent a milking pit, which is the work station for the milker or operator. Vertical metal beams or standards 16 rise from the platform 12 and support overhead support bars 18. A butt rail or splash shield 20 traverses the parlor 10 above the curb 14, and extends the length of the cow stand 12. This defines the back of the cow positions on the platform, i.e., with the cows standing with their rear or hind ends against the splash shield 20.

A swing-up front rail assembly 22 is disposed distally, i.e., to the right in this Drawing, to define the front of the cow positions. Support members 24 are suspended from the overhead support bars 18 and these support an overhead transverse pivot bar 26. A rail member 28 for restraining the cows has a series of positioning loops 30 that project upwards from an upper edge of the rail member 28. A plurality of generally C-shaped support tubes 32 are affixed at their lower ends to the rail member 28 and at upper ends to the pivot bar 26. The upper ends are fitted into sleeves 34 that overfit the pivot bar 26, as generally shown in FIG. 1A. These sleeves 34 can permit a limited amount of play to permit gravity indexing, as will be discussed later. An air cylinder 36 is also fitted to the overhead support bars 18, and has its rod coupled to a swing arm 38 for rotating the front rail assembly 22. With the cylinder in the withdrawn position, as shown in solid lines, the front positioning rail assembly is in its descended or milking position. In this position, the rail 28 restrains the cows on the platform so that they can be milked. When the cylinder 36 is actuated to extend the rod, as shown in ghost, the positioning rail assembly 22 is raised to a release position, so that after milking the cows can leave the platform 12 and proceed out of the parlor 10. The front positioning rail assembly 22 is then lowered again before the next group of cows to be milked enters the parlor.

In FIG. 1 a cow C is shown in ghost lines to illustrate the position of the cow for milking. The cow C stands at an angle to the curb 14 and to the rail 28, with her rear end against the butt rail 20 and with her head projecting over the top of the brisket rail 28. As shown here, the rail member 28 has a somewhat chamfered cross section, with a sloping surface 40 that meets the brisket of the cow C, that is, the portion of the front of the cow above her front legs and below her neck. This sloping surface 40 generally conforms to the shape of a cow's brisket.

Figure 2:
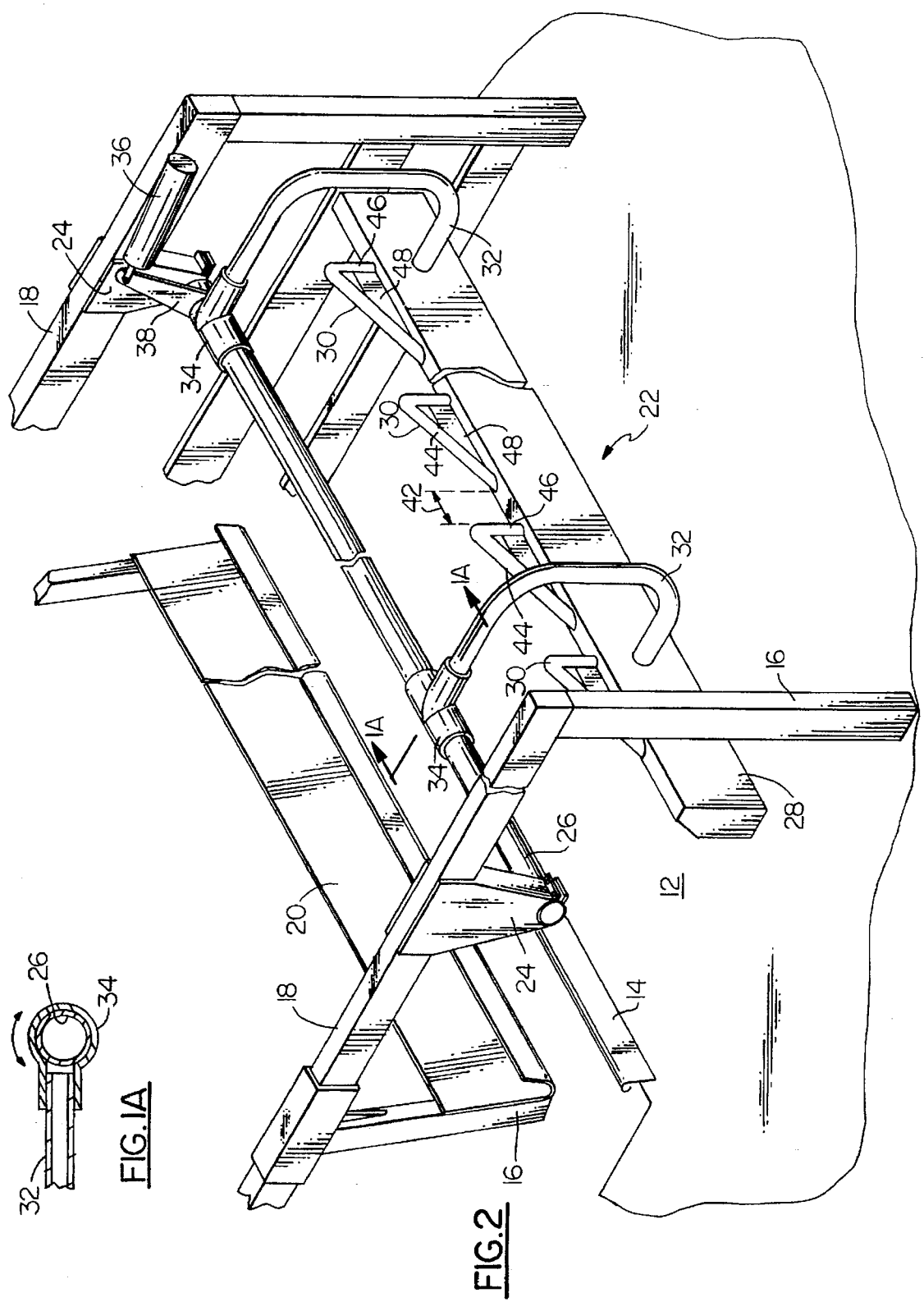
FIG. 2 is a perspective view of the diagonal milking according to this embodiment.

As shown in FIG. 2, the positioning loops 30 are somewhat triangular in shape, and are positioned so that there is a space 42 of about six inches between the loops 30. Each loop has a sloping side 44 and a vertical side 46, the vertical side being on the side away from the cow entry. A sheet metal gusset 48 fills in the inside of each loop 30 to prevent cows from attempting to place their front hooves through the loops.

In an alternative embodiment (not shown) the front positioning rail can employ non-tapered positioners or loops. This alternative will achieve similar benefits of positioning laterally, although the preferred embodiment also achieves indexing of cows of mixed length.

As just mentioned, there is a six-inch spacing 42 between the loops 30. The cows C preferably place their heads in this position, that is, directly on top of the rail member 28, as this is the most comfortable position for the cow. In practice, this distance is about thirty-four inches above the platform 12. As the cows move out of this position to forward, the forward-inclined loop sloping side 44 impacts the cow C in the throat area. This permits, but discourages, the cow from sliding forward. This causes some discomfort that intensifies as she slides down the rail. This feature encourages the cow first to back up against the splash shield 20, and then slide down the rail 28 only as necessary. The larger cows, and those that must move down the rail after they are backed up against the splash shield, are generally also taller. Thus, these cows will be less hindered by the inclining loop 30. On the other hand, the smaller cows are generally shorter, and subsequently are hampered more by the positioning loop 30 as they move forward. Hence the shorter cows will be urged back against the splash shield.

For a given location of the rail member 28, the larger cows and the smaller cows will all be positioned rearward against the splash shield. The smaller, i.e., shorter cows will be positioned at the lower part of the sloping side 44 of the positioning loop, while the larger or longer cows will be in a more forward, or higher, location of the sloping side 44 of the respective positioning loop 30. This means that the longer and shorter cows will be at slightly different angles, but all cows will be in the most rearward position against the splash shield with optimum access for milking.

Additionally, the triangular shape of the positioning loops 30 discourages the cows from turning around, because to do so means they would have to lift their heads up sharply approximately twelve inches, i.e., to a height of about forty-six inches. This tends to be uncomfortable for the cow and discourages her from turning around towards the entry direction. However, she can be coaxed forward, albeit with a slight amount of discomfort, if she drops her head down into a position before moving to the most forward available position when entering the parlor.

Figure 3:
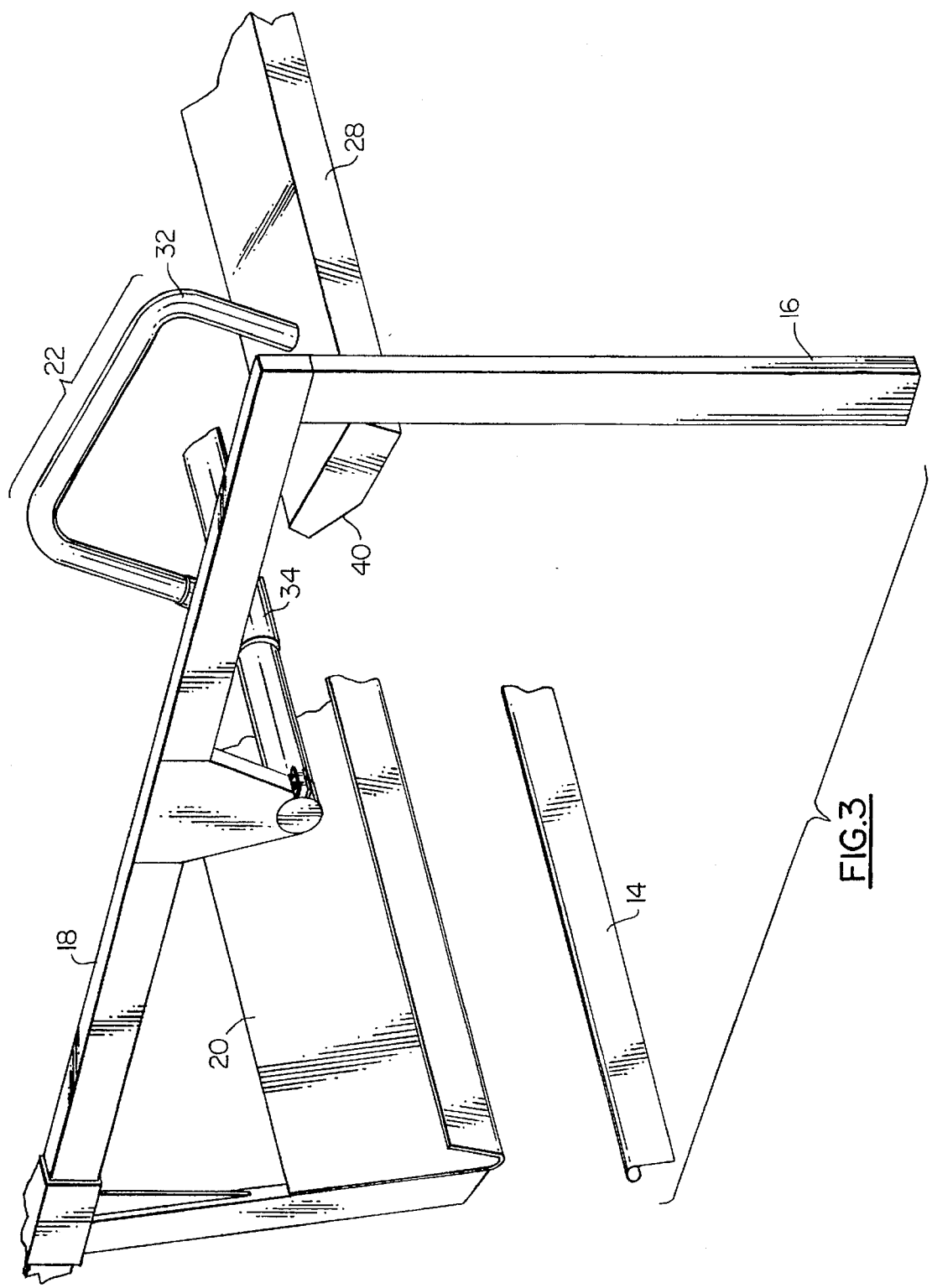
FIG. 3 is a partial perspective view showing the front positioning rail in its elevated or release position.

When the cows are marched into the parlor 10, the rail member 28 can be moved gently back, as necessary, to index the cows and move their rear ends to the splash shield 20 for milking. This can be done employing a dual-action air cylinder, or employing a gravity indexing system, similar to what is described in my earlier U.S. Pat. No. 5,285,746, issued Feb. 15, 1994. The cows will space themselves generally evenly at the rear end in positions that correspond to the pre-positioned automatic milking equipment. The cows adjust their angles and head positions as just described. The attendant or operator can then clean the cows' udders and attach the milking equipment, accessing from the side or the rear of the cow. When the milking is complete, the attendant removes the milking equipment, and actuate the cylinder 36. This raises the front positioning rail assembly 22 to the raised or release position, as generally shown in FIG. 3, and the cows exit beneath the raised front rail member 28. After this, the assembly 22 is lowered to the descended position, and the next group of cows to be milked enters the parlor 10, where the milking sequence is repeated.

For gravity indexing, the sleeves 34 can permit the rail assembly 22 to have a proximal-distal play of several inches when the rail is in the lowered or milking position. Gravity brings the rail gently back against the cows to urge them against the splash shield.

In the embodiment described and illustrated here, the cows can be positioned at an angle of up to about 70 degrees. The cows are discouraged or prevented from turning around in the parlor, even in the absence of sequencing gates or similar devices. The front positioning rail member 28 defines the front position for the cows and the positioning loops 30 define the head positions for optimal and efficient spacing of the cows. At the same time, the shape of the loops 30 permits the larger cows to move up slightly so that both the long and short cows are properly indexed against the splash shield, for best access to the udders. The loops 30 discourage the cows from changing angle until the cows have been backed up against the splash shield.

The invention has been described herein with reference to a single preferred embodiment, but the invention is not limited to that embodiment. Rather, many modifications and variations will become apparent to persons skilled in the art without departing from the scope and spirit of this invention, as defined in the appended claims.

I claim:

1. A front positioning rail for a milking parlor in which cows stand alongside one another, said front positioning rail being movable between a milking position and a release position, wherein in the milking position the rail restrains said cows with their heads projecting over the rail and with the rail contacting briskets of said cows above their front legs and below their heads, said front positioning rail comprising:

an elongated rail member extending laterally, having a proximal generally vertical side and a horizontal upper edge;

a plurality of vertical positioning loops rising above said upper edge and defining head positions for said cows between successive ones of said loops, said positioning loops having left and right edges, and being spaced from one another at a predetermined interval, each said interval defining the respective head position and means for moving said rail member between said milking position and said release position so that said cows can exit said parlor.

2. The front positioning rail of claim 1 wherein said rail member proximal side has an upper tapered portion that slopes distally upwards so as to conform generally to the shape of a cow's brisket.

3. The front positioning rail of claim 1 wherein said loops each have at least one of said left and right sides sloping diagonally upward.

4. The front positioning rail of claim 1 wherein said loops each have one of said left and right sides rising substantially vertically and the other of said left and right sides sloping diagonally upward.

5. The front positioning rail of claim 1 wherein said loops each include a gusset affixed on an inside of the loop to prevent cows from placing their hooves through the loop.

6. The front positioning rail of claim 1 wherein said means for moving the rail member includes an overhead pivot above said rail and a swing-up support member supporting said rail member and journal means journalled on said overhead pivot.

7. The front positioning rail of claim 6 wherein said journal means includes means permitting proximal-distal play of several inches when the rail is in the milking position.

8. The front positioning rail of claim 6 wherein said support member includes a plurality of U-shaped members connecting said journal means and said rail member.

9. The front positioning rail of claim 1, wherein said loops are generally triangular in shape.

10. A milking parlor for milking dairy animals including a cow platform on which said animals are positioned for milking between a splash shield and a front positioning rail, said rail being movable between a milking position and a release position, wherein in the milking position the rail restrains said animals with their heads projecting over the rail and with the rail contacting briskets of said animals above their front legs and below their heads, said rail comprising an elongated rail member extending laterally, having a proximal generally vertical side and a horizontal upper edge; a plurality of vertical positioning loops rising above said upper edge and defining head positions for said cows between successive ones of said loops, said positioning loops having left and right edges, and being spaced from one another at a predetermined interval, each said interval defining the respective head position and means for moving said rail member between said milking position and said release position so that said animals can exit said cow stand.

11. The milking parlor of claim 10 wherein said loops each have one of said left and right sides rising substantially vertically and the other of said left and right sides sloping diagonally upward.

* * * * *